Jan. 15, 1929.
C. A. STICKNEY
1,698,925
MACHINE FOR MAKING LATH BOARD
Filed March 31, 1923     12 Sheets-Sheet 1
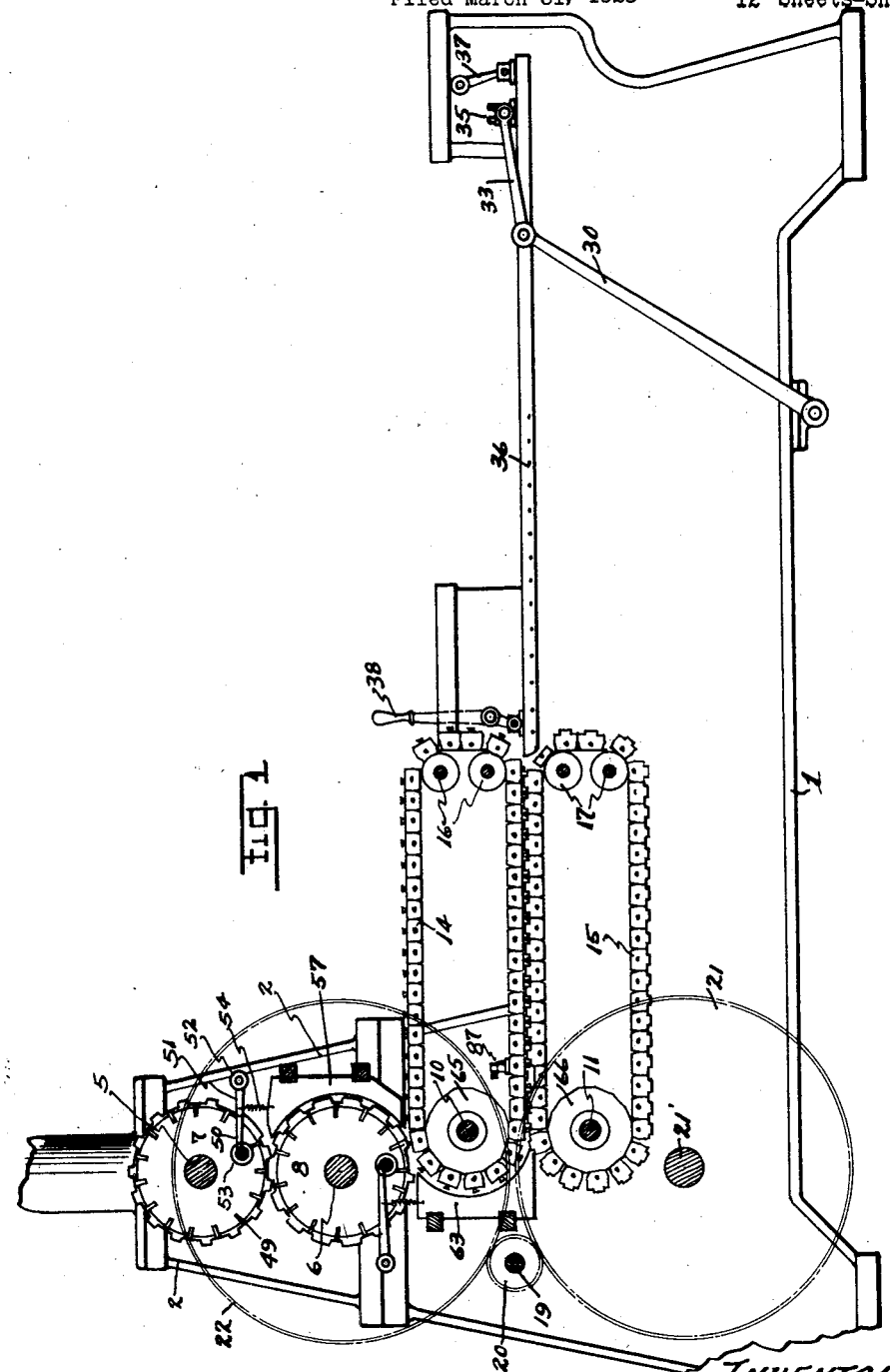

Jan. 15, 1929.
C. A. STICKNEY
1,698,925
MACHINE FOR MAKING LATH BOARD
Filed March 31, 1923   12 Sheets-Sheet 2
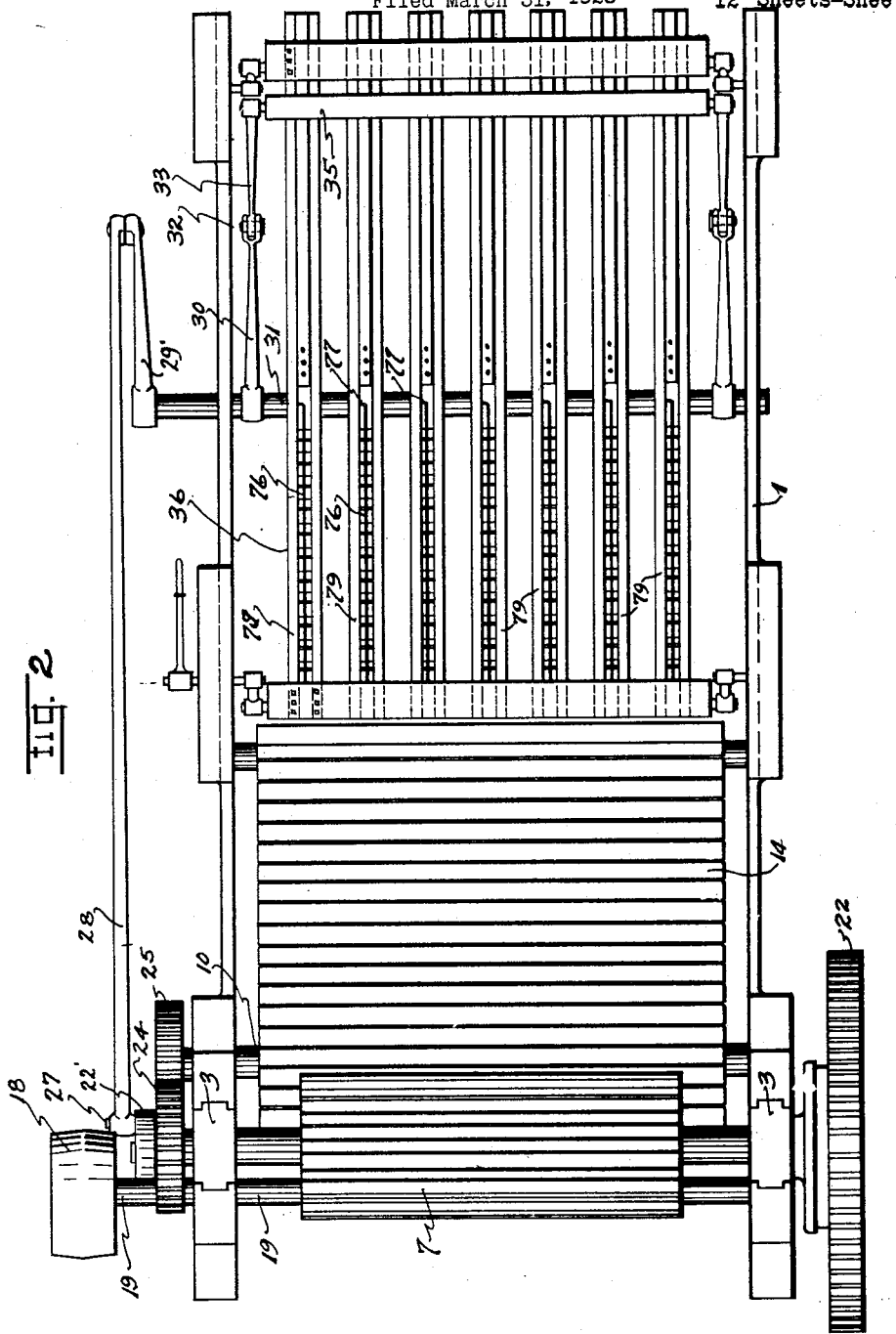
INVENTOR
CHARLES A STICKNEY
By C.D. Enochs
ATTORNEY

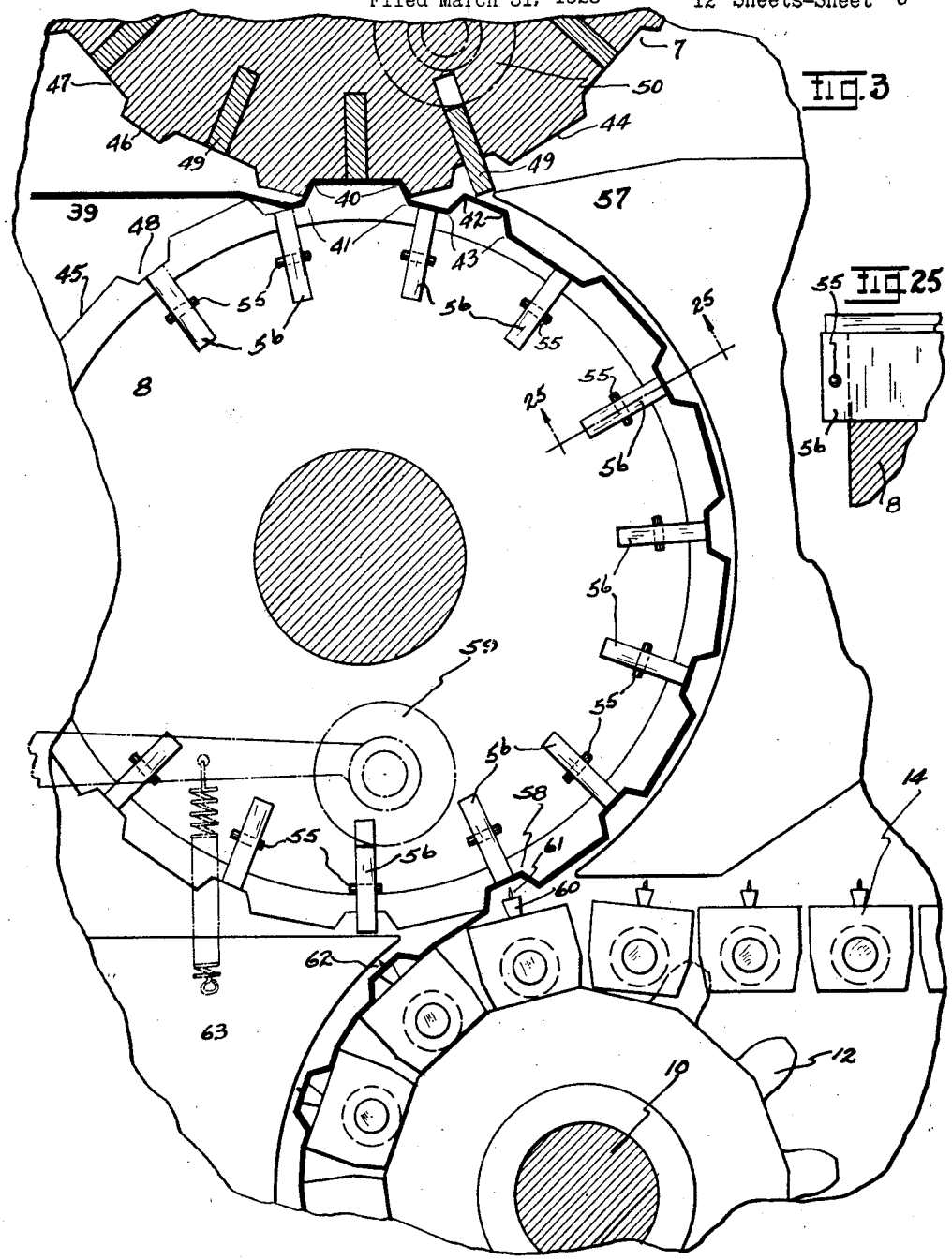

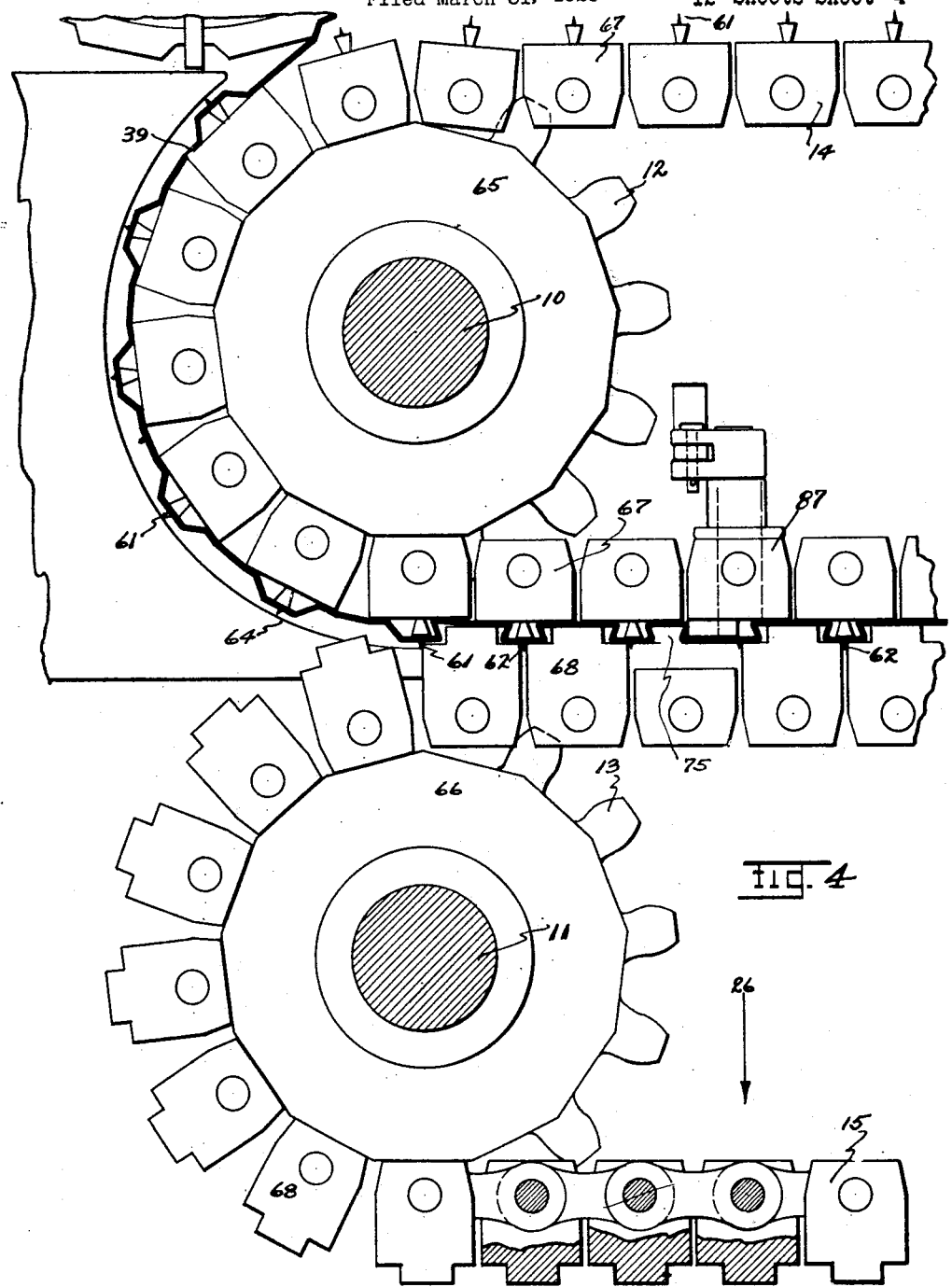

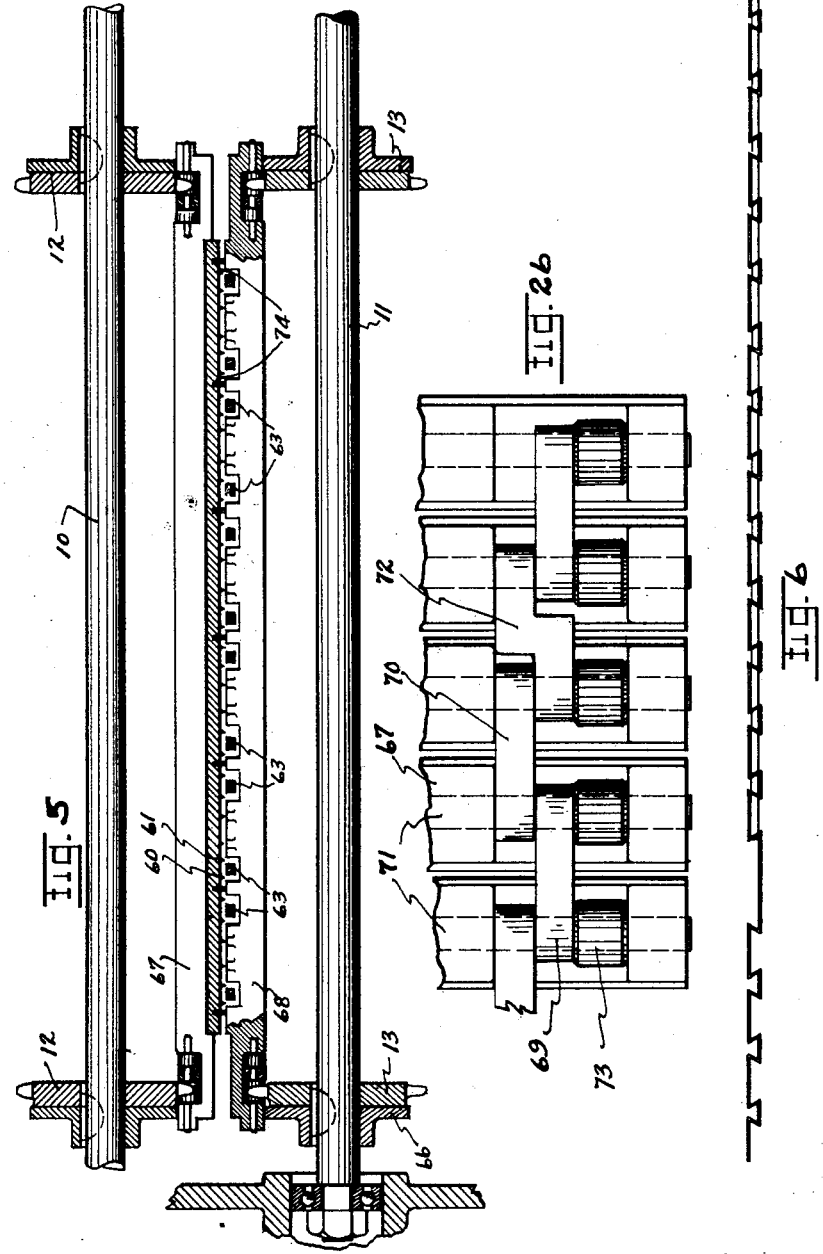

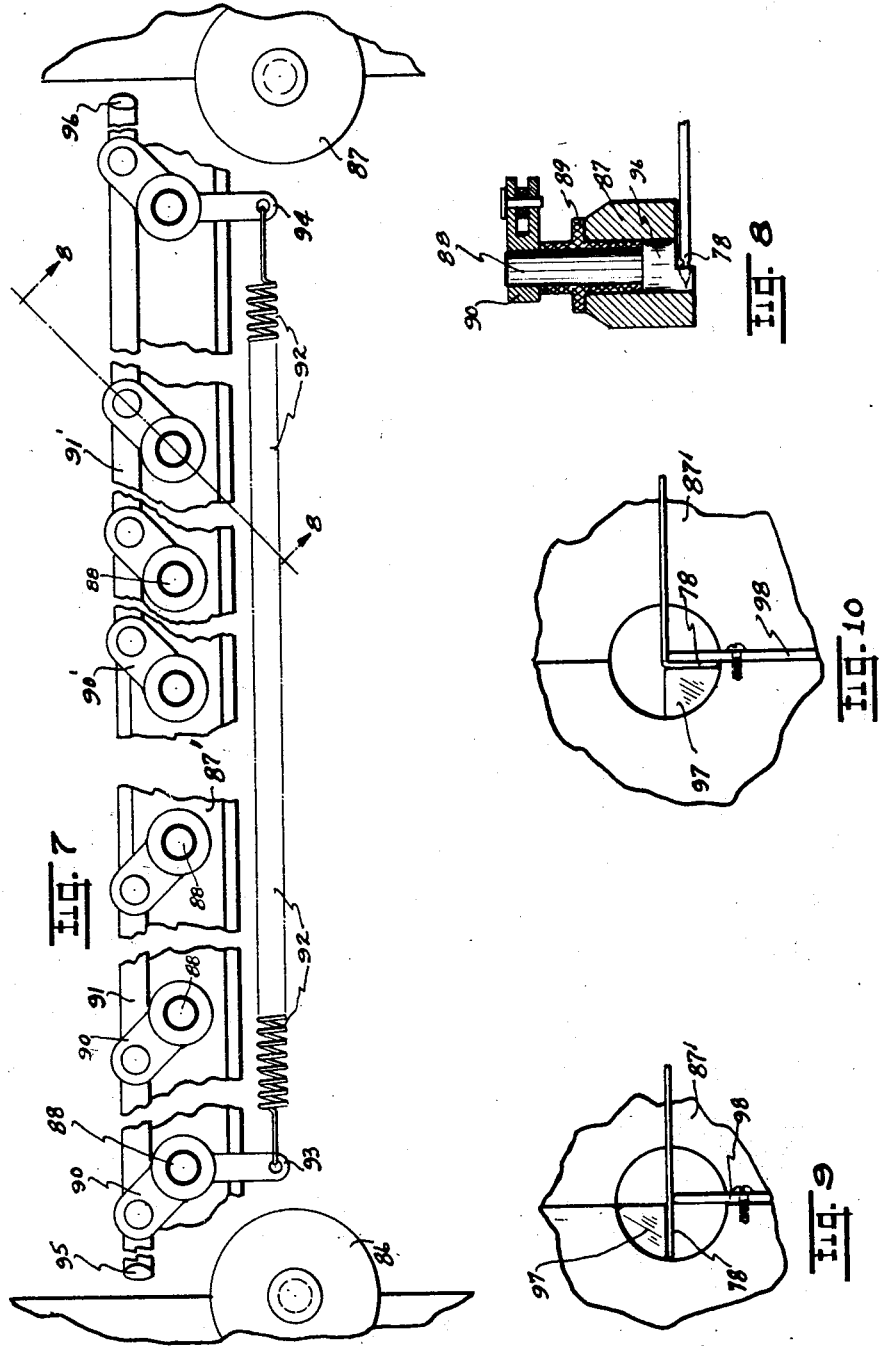

Jan. 15, 1929.  
C. A. STICKNEY  
1,698,925  
MACHINE FOR MAKING LATH BOARD  
Filed March 31, 1923    12 Sheets-Sheet 7
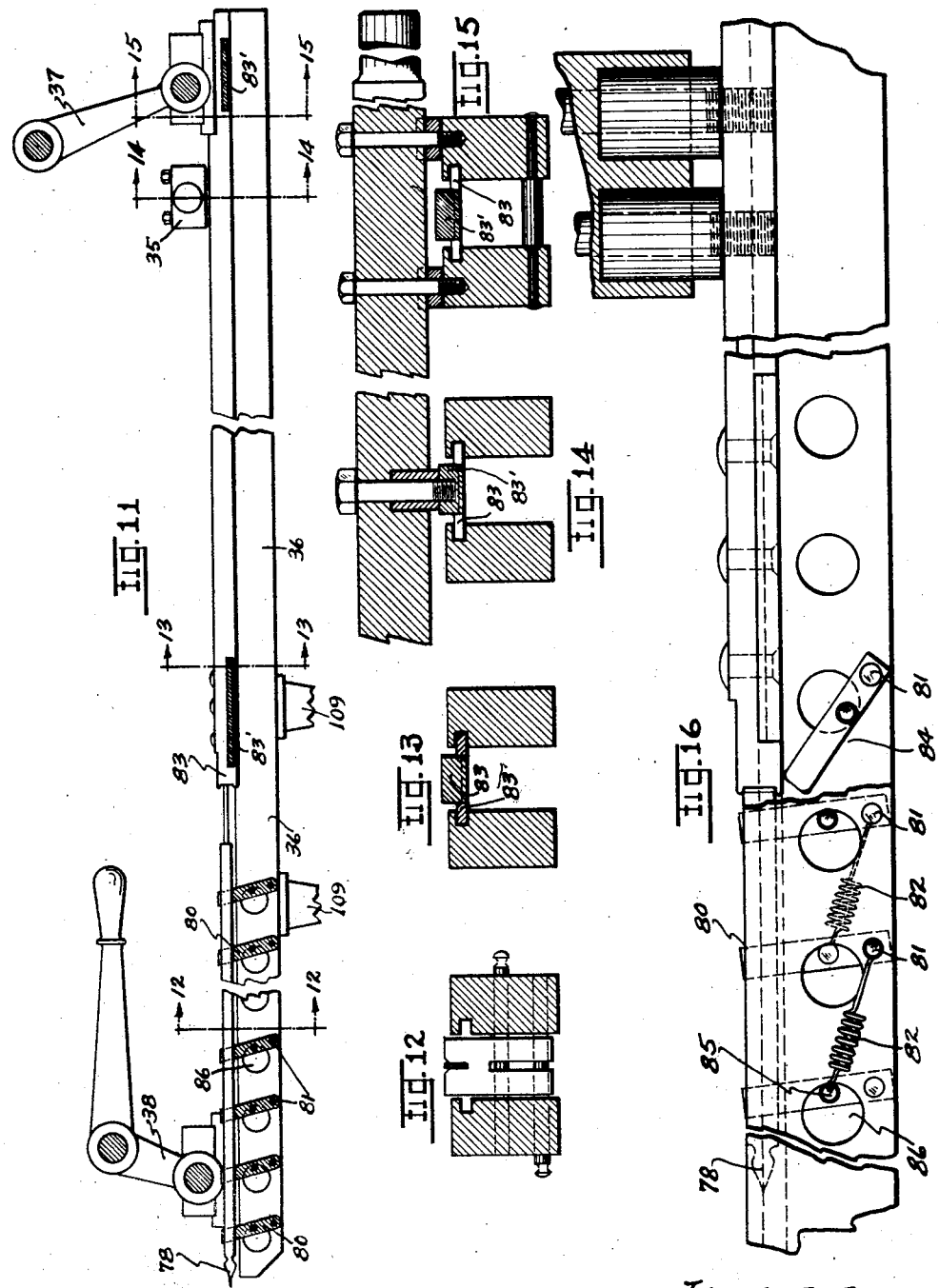
INVENTOR  
CHARLES A STICKNEY  
BY C. F. Enochs  
ATTORNEY Jan. 15, 1929.　　　　　　　　　　　　　　　　1,698,925
C. A. STICKNEY
MACHINE FOR MAKING LATH BOARD
Filed March 31, 1923　　　12 Sheets-Sheet 8
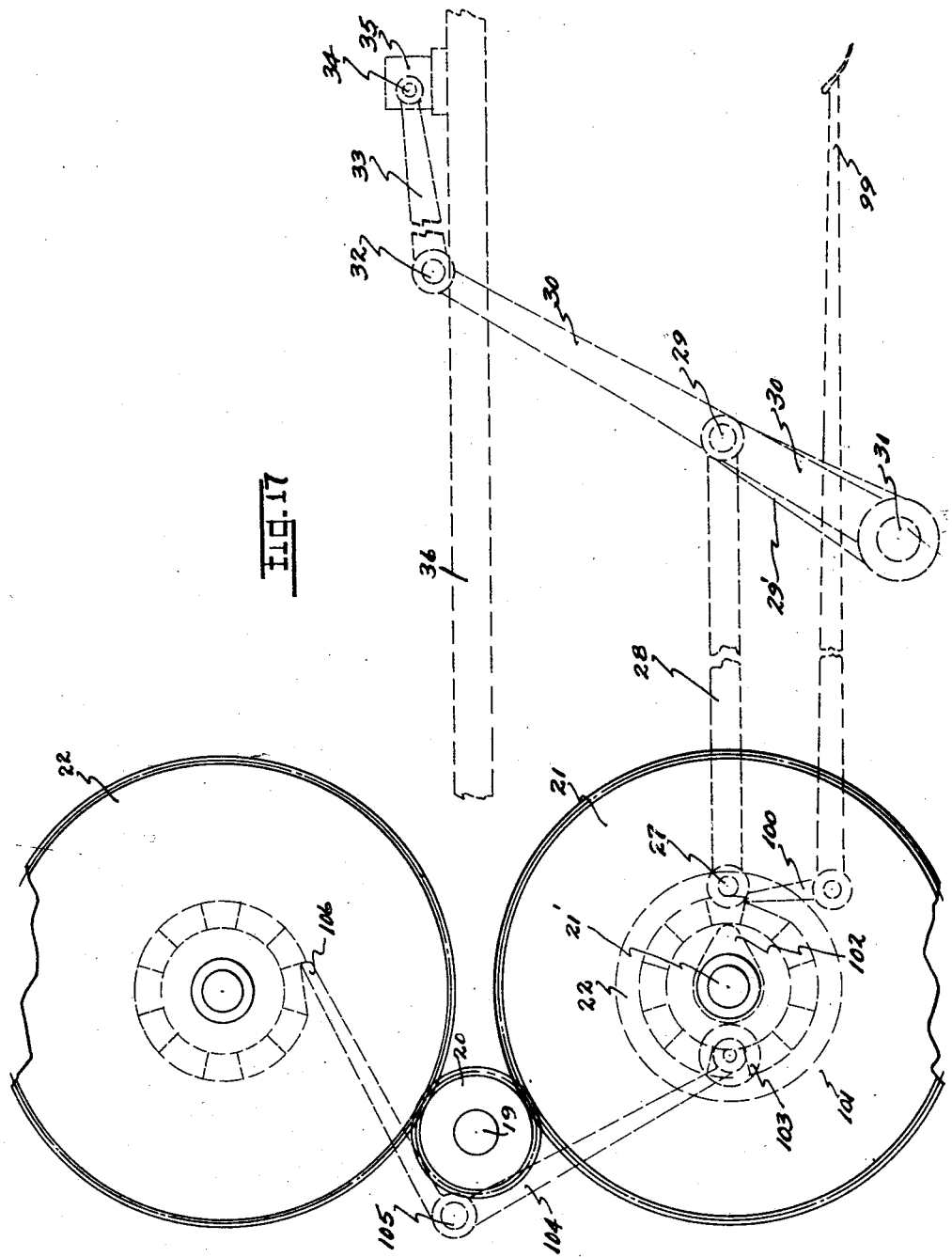
INVENTOR
CHARLES A STICKNEY
BY C.A.Brooks
ATTORNEY Jan. 15, 1929.
C. A. STICKNEY
1,698,925
MACHINE FOR MAKING LATH BOARD
Filed March 31, 1923      12 Sheets-Sheet 9
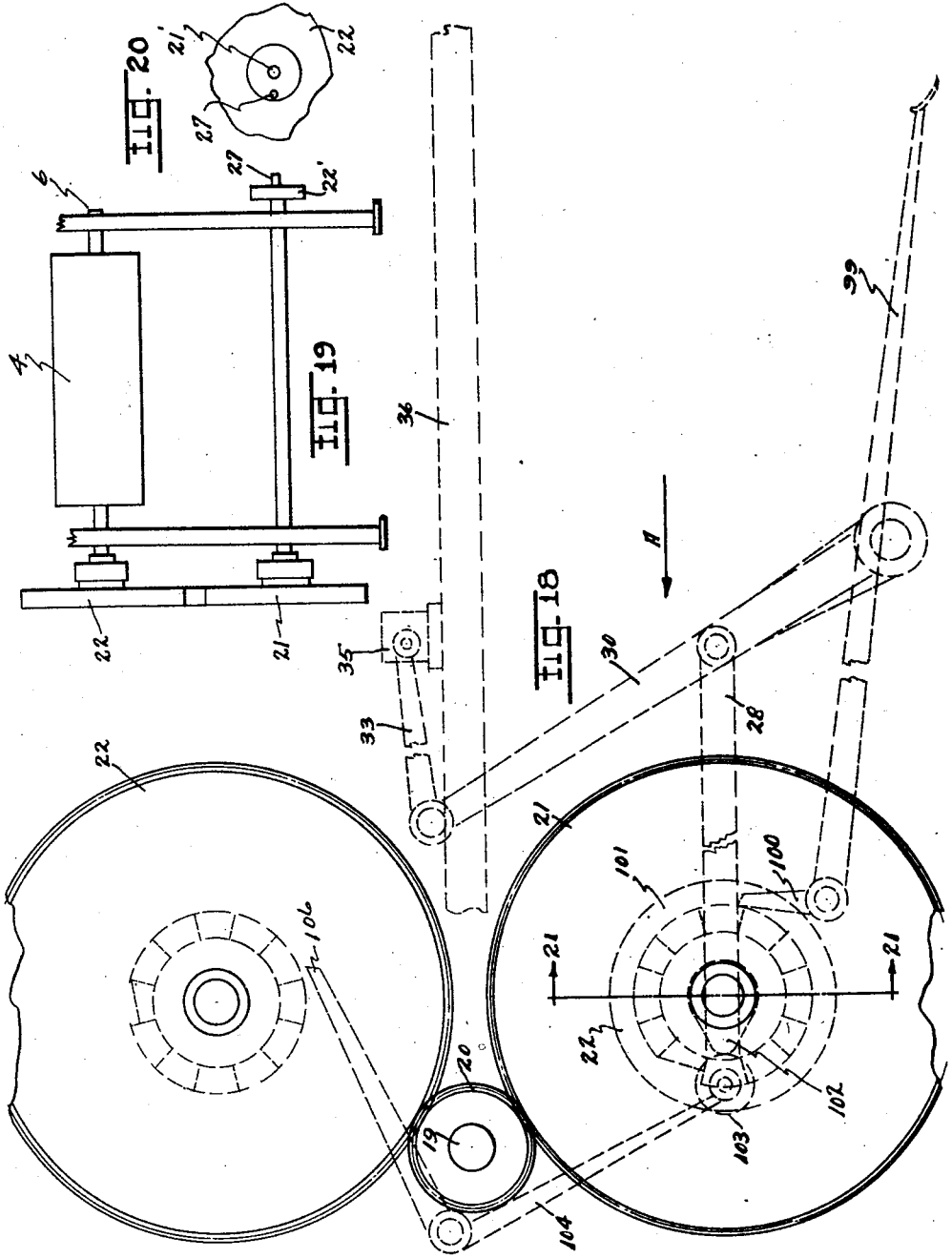
INVENTOR
CHARLES A STICKNEY
BY
ATTORNEY Jan. 15, 1929.  1,698,925
C. A. STICKNEY
MACHINE FOR MAKING LATH BOARD
Filed March 31, 1923     12 Sheets-Sheet 10
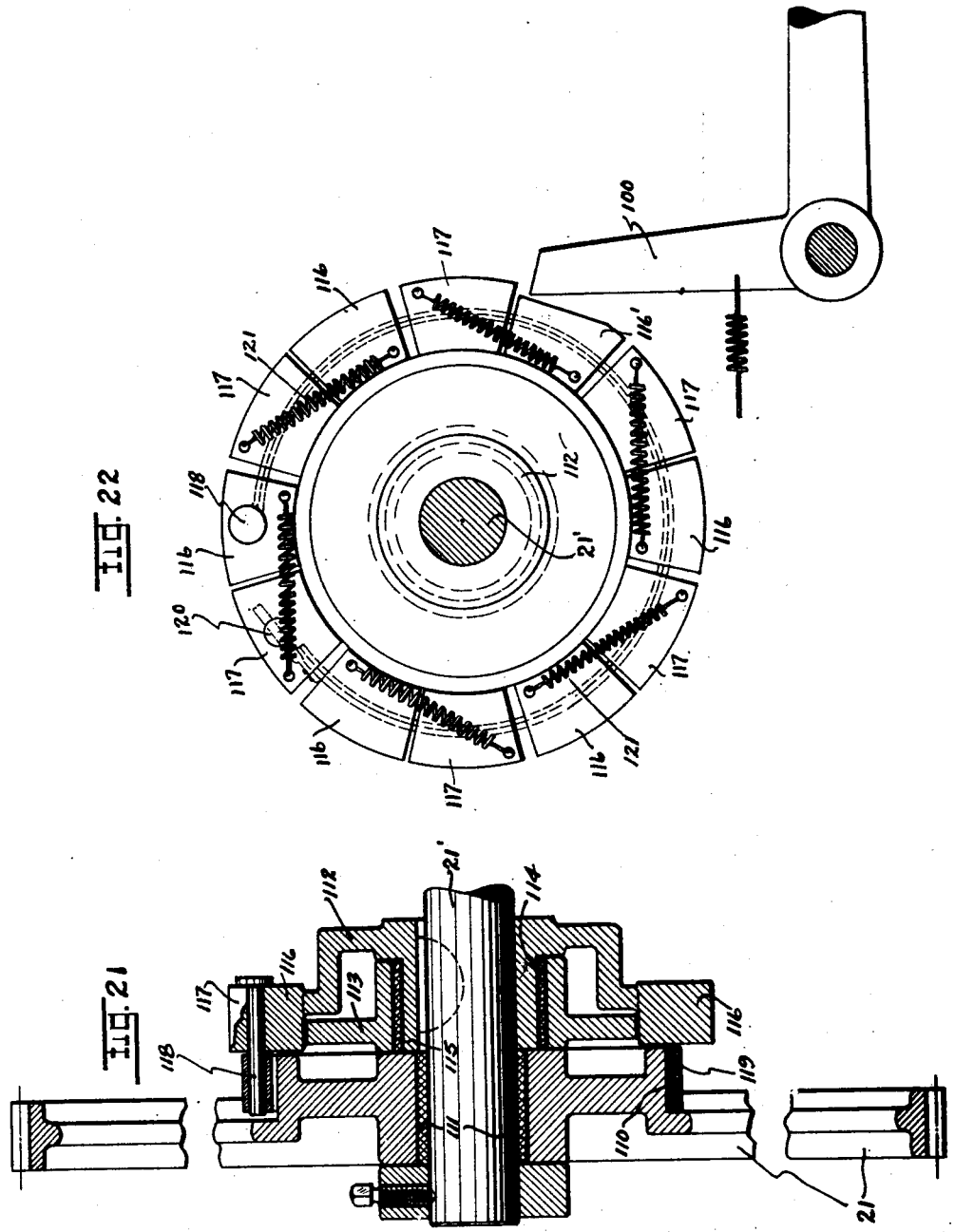
INVENTOR
CHARLES A STICKNEY
BY C.D.Enoch
ATTORNEY

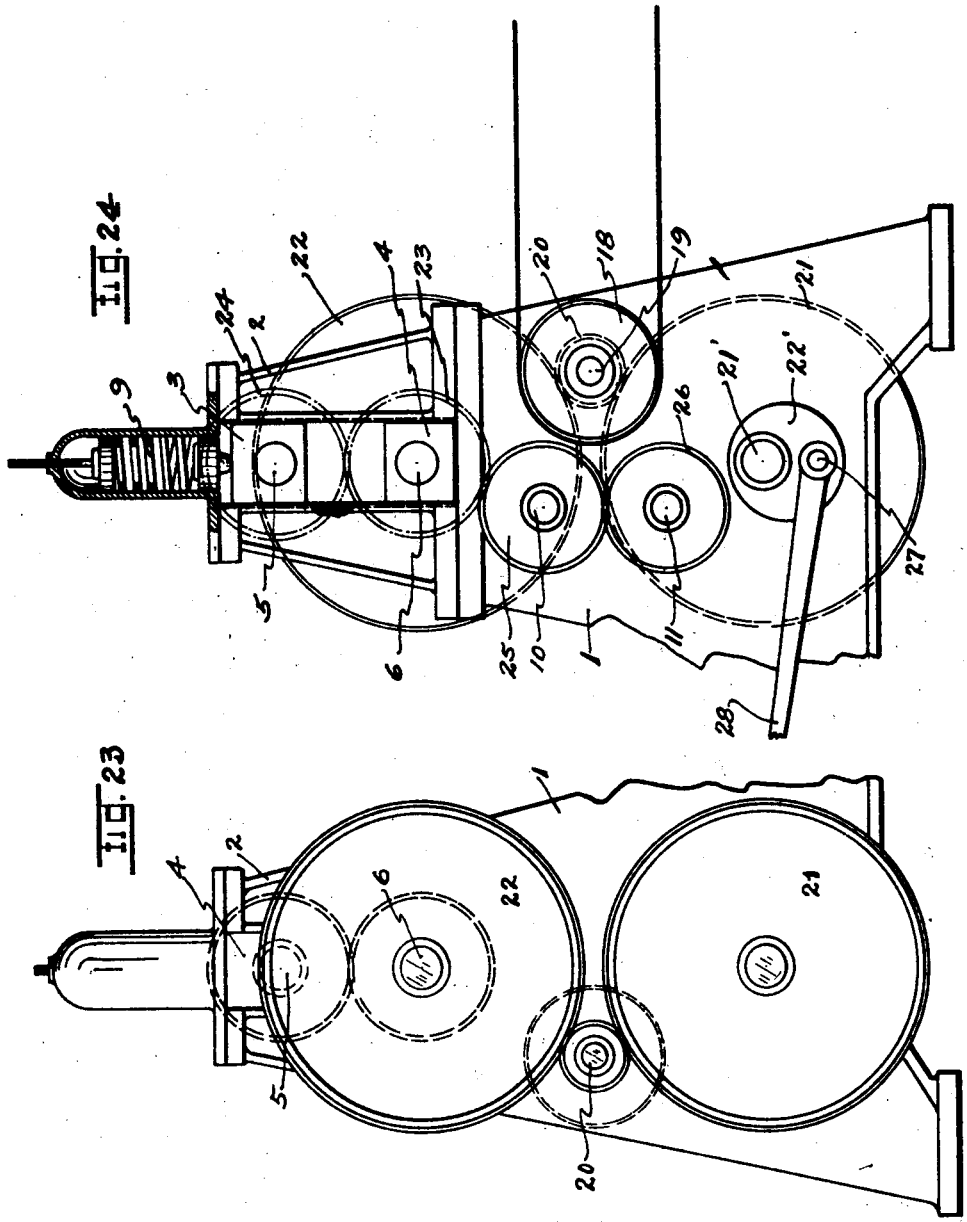

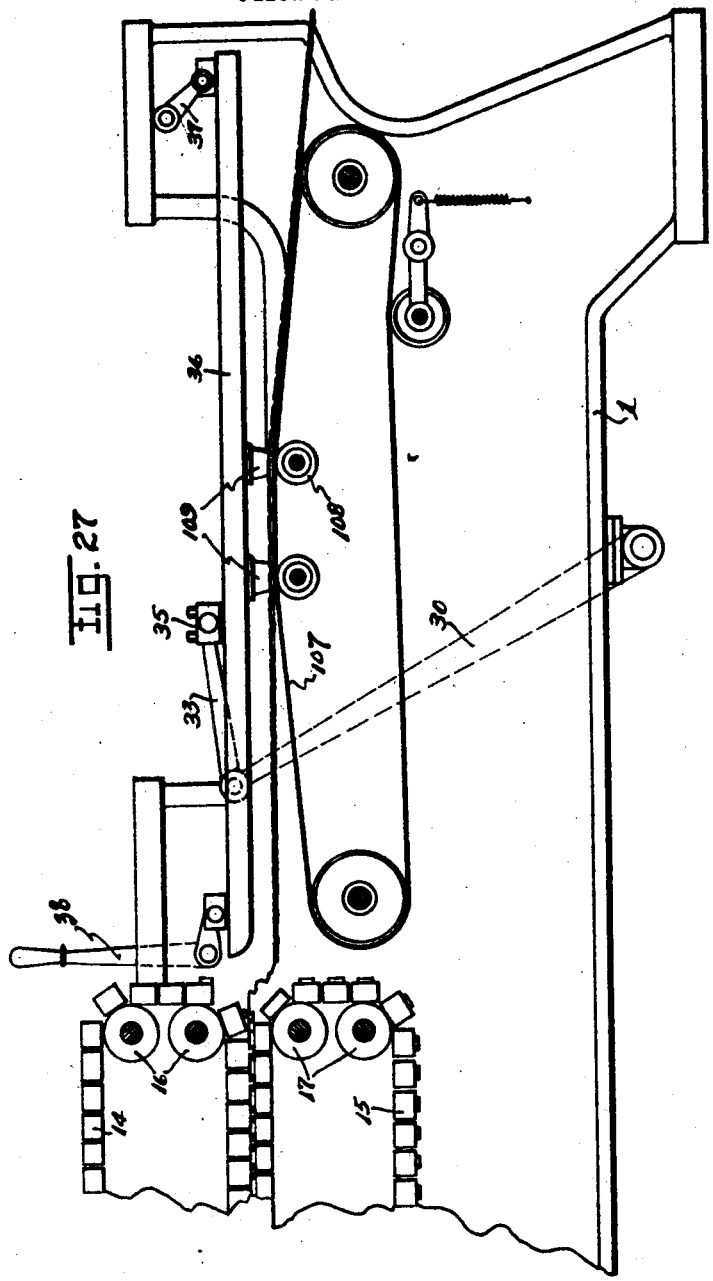

Patented Jan. 15, 1929.

1,698,925

UNITED STATES PATENT OFFICE.

CHARLES A. STICKNEY, OF ST. PAUL, MINNESOTA, ASSIGNOR, BY MESNE ASSIGNMENTS, TO CLARA P. FORD, OF ST. PAUL, MINNESOTA.

MACHINE FOR MAKING LATH BOARD.

Application filed March 31, 1923. Serial No. 629,117.

One object of my invention is to provide in a machine for making lathboard means for corrugating a sheet of suitable material into the desired shape and then wire it permanently into that shape while still in the machine.

Another object is to provide an improved means for scoring the paper where it is to be folded.

Another object is to provide a combination with means for corrugating material, of means for gathering the corrugation so formed into dove-tailed plaited formations.

Another object is to provide improved guides for leading the material from one part of the mechanism to another.

Another object is to provide means for stopping the material at predetermined points so reinforcing wires may be accurately threaded into the material.

Another object is to provide means for folding the ends of the reinforcing wires over so as to securely hold the material through which they have been threaded.

Another object is to provide means for passing the wired material out beyond the machine while unwired material is being operated on.

Another object is to provide improved guides for the wires as they are being threaded or rammed into the material.

Another object is to provide an improved interlocking and co-acting combination of link motions and clutch mechanisms.

With these and incidental objects in view the invention consists of certain novel features of construction and combination of parts, the essential elements of which are hereinafter described with reference to the drawings which accompany and form a part of this specification.

In the drawings, Figure 1 is a side elevation of my improved machine with one side frame removed and with operating levers indicated.

Figure 2 is a plan view showing the crimping rollers, slats, wiring members, rams, links, etc.

Figure 3 is an enlarged detail partly in section showing the manner in which the material is crimped and then transferred to the gathering slats.

Figure 4 is an enlarged detail partly in section showing the gathering operation.

Figure 5 is a section taken through one of the slats.

Figure 6 is a side elevation of a portion of the completed lath board before it is cut into units.

Figure 7 is a plan view of one of the wire clinching slats.

Figure 8 is a section taken on the line 8—8, Figure 7.

Figure 9 is a bottom view showing the wire in position for being clinched but before the clinching operation.

Figure 10 is a similar view after the wire has been clinched.

Figure 11 is a side elevation partly in section of one of the wire holders and rams.

Figure 12 is a section taken on the line 12—12, Figure 11.

Figure 13 is a section taken on the line 13—13, Figure 11.

Figure 14 is a section taken on the line 14—14, Figure 11.

Figure 15 is a section taken on the line 15—15, Figure 11.

Figure 16 is a fragmentary side elevation of the ram and wire guides showing the wire partly forced home into the paper.

Figure 17 is a conventional representation of the link and clutch mechanism before the actuation of the foot treadle which starts the motion of the ram.

Figure 18 is a similar view showing the mechanism released so the material may again start in motion.

Figure 19 is a conventional representation of the drum clutch mechanisms viewed from the direction of the arrow —A—, Figure 18.

Figure 20 is an end view of the crank pin operating the ram link mechanism.

Figure 21 is a section taken on the line 21—21, Figure 18.

Figure 22 is an end view of the clutch mechanism shown in Figure 21.

Figure 23 is a fragmentary side elevation from the side opposite to the pulley.

Figure 24 is a fragmentary side elevation, partly in section, taken from the pulley side of the machine.

Figure 25 is a section taken on the line 25—25, Figure 3.

Figure 26 is a fragmentary plan view taken in the direction of arrow 26, Figure 4.

Figure 27 is a fragmentary side elevation partly in section showing the manner in which a completed unit passes out under the wiring guides.

General operation.

The general purpose of this machine is to produce completed lath board of a general dove-tailed shape formation and having reinforcing wires incorporated therein by a continuous passage of a sheet of suitable material through the machine which successively performs the necessary operations on this material.

The machine has a pair of forming rollers, a pair of gathering chains and a reciprocating ram for forcing the reinforcing wires into the sheet, and the length of the chains and the timing of the various mechanisms of the machine are such that three complete units of the completed lathboard will be formed during one cycle of the chain motion.

The material is first passed between the forming rollers which form it into a corrugated sheet, but not into a dove-tailed sheet. However, the action of the rollers is such as to score the corners of the corrugations to such an extent that after the forming and scoring operation, the corrugations may be readily gathered closely together and into a dove-tailed shape.

As the material leaves the rollers, ejectors in the upper roller force the material therefrom and under a suitable guide, or shoe, which insures its remaining on the lower roller until it reaches the transfer point where ejectors in the lower roller force the material from the roller as it is transferred to the upper chains.

This upper chain has not only a series of gathering slats which receive the corrugations of the paper, but also each slat has a plurality of sharp pins which perforate the paper and on which the paper is firmly pressed as it is transferred.

The ejectors not only insure the general positioning of the material on the pins but also pass the material under the second set of shoes or guides so the material is carried by the upper chain around to the point where it meets the lower chain.

As the material carried by the upper chain is seized between the two sets of slats, one set on the upper chain and one set on the lower chain, it has approached the vertical plane of the axes of the first pair of sprocket wheels carrying the chains, and as the motion of the slats at this plane changes from a rotary motion to a straight line motion, it is evident the slats, and hence the material carried thereon will move into a closer position thus gathering the material from the shape in which it has been formed by the forming rollers into the desired dove-tailed shape.

This particular method of gathering of the material from a corrugated sheet into the desired dove-tailed shape is very similar to that disclosed in Patent No. 1,251,879, January 1, 1918, issued to Silas M. Ford for "machine for making lath board" and hence is not broadly claimed in this application. However, my invention does contemplate improvements on the device illustrated in the patent aforesaid, and these improvements, together with the application of this gathering mechanism in general, with novel elements in the present machine will be claimed in the present application.

The material as it is gathered into the dove-tailed shape formation moves along between the pair of chains until one-third of the cycle of motion on the chains has taken place at which point the operation of the rollers and general mechanism is stopped.

A plurality of reinforcing wires in the meantime have been placed in a set of wire guides and when the motion is stopped a foot lever is tripped, and then a reciprocating ram forces these wires through the webs of the formed paper into their proper position, and by suitable mechanism the piercing ends of these wires are formed over to prevent the material stretching out of the shape to which it has been formed, and, as the opposite ends of the wires were formed over into an L head before they were placed in the guides, the wires are then securely locked into the paper.

After making the forward stroke, which forces the wires into the material, the ram returns to its normal position, the wire guides swing up out of the way and the formed and wired material is passed out of the machine below the wiring guides on the further motion of the chains.

This completes one unit length of the lath board and a fraction of material which is not wired is left between units to allow flexibility of the series of these units as they pass from the machine to a point where the units may be cut apart by any suitable means.

When the material is again in motion after the first unit has been made, a second unit is formed in a similar manner, and, as stated, three units are formed by one cycle of motion of the chains.

Having described the general operation, to facilitate the understanding of the mechanism, I will now describe the various parts of the mechanism which accomplish the results already set forth.

Main operating mechanical movements.

The machine consists of a cast bed or frame 1 to which is bolted an upper frame or cap 2, see Figures 1 and 2.

Slidable boxes 3 and 4, Figure 24, have journaled therein shafts 5 and 6 which drive the forming rollers 7 and 8 respectively, and a plurality of springs 9 provide pressure between the rollers 7 and 8.

Suitably journaled in the frames, the shafts 10 and 11 drive sprockets 12 and 13 respectively which in turn drive chains 14 and 15 respectively.

Rollers 16 carried by suitable shafts journaled in the frame are provided at the opposite end of chain 14 and similar rollers 17 are provided for the chain 15.

The power pulley 18, Figures 2 and 24, which is driven by any suitable source of power, drives the shaft 19 to which is keyed the pinion 20 which in turn drives gears 21 and 22.

The gear 22 is keyed to the shaft 6 which drives the gear 23 as well as the drum 8.

The gear 24 is likewise driven by the gear 23 and in turn drives the shaft 5 and drum 7. The gear 23 also drives gear 25, which is keyed to the shaft 10 and hence drives the sprocket 12, and through the sprocket 12 the chain 14.

The gear 26 is driven by the gear 25 and is keyed to the shaft 11 through which it drives the sprocket 13 and hence the chain 15.

The gear 21 drives the shaft 21' which has keyed thereto a disk 22', and this disk has a crank pin 27 to which is hinged the connecting rod 28, which in turn is hinged at 29 to a lever 29' which is keyed to the shaft 31 to which the lever 30 is likewise keyed.

The upper end of the lever 30 is hinged at 32 to the drag link 33 which in turn is hinged at 34 to the reciprocating ram 35.

The wire guide 36 which consists of a frame having a plurality of individual guides therein, is hung from the frame by the link 37 and the bell crank 38, so the hand movement of the bell crank will swing the guide counterclockwise and upwardly for the purpose already described.

*Crimping or forming operation.*

As the material 39, Figure 3, is set between the rolls 7 and 8 it is corrugated into rectangular corrugations and the material is scored at the points 40—41—42 and 43.

This scoring is an important item in the successful formation of dove-tailed sheet plaits because if the material is not heavily scored it is practically impossible to gather it into the desired dove-tailed shape.

Looking at Figure 24, it will be seen the roller 7 is held with heavy pressure against the material that is being formed through the action of the springs 9 which permit the slight lifting action necessary when the rolls 7 and 8 co-act one with the other, because the faces 44—45—46—47 and 48 are all straight and not cylindrical.

Moreover, the angles of the groove in the roller 7 at points 40 are less than the angles at the top of the slat-like faces on the roll 8 that press the material into the grooves whereas the width of the faces and grooves are the same, or substantially the same.

It will be evident therefore that when the rolls are in the position shown in Figure 3, the material will be scored in exactly the same manner as if it had been acted upon by a reciprocating press in which the slat face of the roller 8 was the punch and the groove of the roller 7 was the die.

Similarly the scored lines at 41 will be formed when the rolls have turned so the narrow slat-like faces and grooves are prependicular to the axial plane of the two rolls.

As the material is carried forward beyond the axial plane of the rollers, the ejectors 49 in the roller 7 are actuated by the cam 50, Figures 1 and 3.

This cam comprises a lever 51 hinged at 52 to the frame of the machine, and having a roller 53 at its free end so positioned as to co-act with the ejectors as they pass under the cam roller surface. The spring 54 is provided to give sufficient pressure to operate the ejectors and these ejectors, which are strips slidably mounted at the grooves in the rollers, are prevented from being forced entirely out of the grooves by pins 55 impinging against the tongues 56 at each end of the ejector strips.

The ejectors free the roll 7 from the material and assure its remaining tightly on the roll 8 until it passes under the guide 57, this guide being a plurality of shoes positioned across the width of the material.

As the material is carried on the roll 8 to the point 58, it is brought into operative relation with the chain 14 and the ejectors in the lower roll actuated by cam 59, which is similar to the cam 50, force the material from the roll 8 and onto the strips 60, the pins 61 puncturing the material, as plainly shown at 62, see also Figure 5.

The ejectors having forced the material onto the pins also insure its passing under the guide 63, which is similar to the guide 57.

*Gathering operation.*

As the material is carried on the chain 14 with a circular motion, the pitch of the corrugations has not been changed from that formed by the corrugating rolls, but as the material is carried to the point 64, Figure 4, the chain 15 presses against the material so that it is seized between the two chains, and as it passes the axial plane of the shafts 10 and 11 its motion is transformed from a circular motion to a straight line motion with the result that the corrugations must of necessity change pitch and be brought closer to each other.

Inasmuch as the material is firmly held by the pins 61 as well as by the grip of the chains, it is forced into the required dove-tailed shape, and the importance of the scoring will here be appreciated, as if the scoring had not been effectively accomplished the angles of the dove-tails would be uneven and irregular.

The shafts 10 and 11 carry the sprockets 12 and 13 and also what I refer to as rectifying discs 65 and 66, which are merely discs having flat faces thereon to positively position the slats 67 and 68 of the chains 14 and 15 respectively as they pass over these rectifying discs.

It is evident that as a slat moves onto its co-acting rectifier face it will be slightly tilted, and likewise as it leaves the rectifier face it will be slightly tilted and this action assists in the proper receiving and delivering of the material by the chains.

Referring to Figure 26, it will be noted that the slats 67, which in this regard are exactly similar to slat 68, are cut out at each end and that links 69 and 70, which are hinged together by pins 71, hold the slats together in chain-like formation, and that a special link 72 is provided to connect the ends of the chain, because in the particular chain which I employ there is an odd number of slats. Rollers 73, likewise carried by the pins 71, ride on the sprockets 12 so that while the slat faces themselves rest on the flat faces of the rectifiers the drive is from the sprockets to the rollers 73, which with the links 69 form roller chains.

The cross section view of Figure 5 clearly shows the co-operation between the upper slats 67 and the lower slats 68, and the manner in which the pins 61 meet the lower slats.

The slots 74 are provided for allowing the reinforcing wires to be passed into the material while it is still held by the slats, and the lower forward end of the shoes forming the guide 63 is clearly indicated in this view.

Wiring operation.

When the material reaches the point 75, Figure 4, the mechanism is stopped by means hereinafter described, and the foot lever 99 is tripped, and ram 35, Figure 17, moves to the left forcing the wires 76, Figure 2, through the webs of the material as it is held by the slats, these wires passing through the slots 74, Figure 5.

The ends of the wires 77 have been formed over at right angles to the length thereof before the wires are placed in guide 36, and after the wires have been rammed entirely home the forward ends 78, Figure 11, are bent over at right angles to hold the material in its formed position between the bent over ends of the reinforcing wires.

The wire guide 36 consists of seven individual guides 79, each of which is comprised of a plurality of slotted members 80 hinged to the guides 79 at 81, and which are normally held in an upright position by springs 82.

The reinforcing wires are laid in these guides as shown in Figure 2, and as the head 83 of the ram moves to the left these guides swing out of the way, as plainly shown at 84, Figure 16. The pins 85 to which the springs 82 are fastened extend through apertures 86 of the guides 79, these apertures serving to limit the motion of the slotted members 80.

With the wires in their proper location, the forming of the ends 78 is accomplished as follows:

Cam rollers 86 and 87 mounted in the frame of the machine at each side thereof co-act with the mechanism of a special slat 87' carried by the upper chain 14, see Figures 1 and 7 to 10 inclusive. This wire forming slat has a plurality of vertically disposed shafts 88 journaled in the bushing 89. Bell cranks 90, rigidly fastened to the shafts 88 are connected by a link 91 to which three bell cranks are hinged, and on the opposite end of the slat four similar bell cranks 90' are hinged to the link 91', the set on one side being right handed, and on the other side left handed, and these two sets are connected by a spring 92 connecting the tongue 93 of one of the bell cranks on one end with the tongue 94 of one of the bell cranks on the slat 87'.

It is evident that when the ends 95 and 96 impinge on the cam rollers 86 and 87, these bell cranks will be rotated and hence the shafts 88 will likewise be rotated. The head 96 of the shafts 88 is cut away leaving one-quarter, 97, as shown, which serves as a forming die, and upon the rotation of the shaft 88 bends the spear-head end 78 of the reinforcing wires around at 90° until it impinges on the tongue 98 carried by the slats 87'.

The ram 35 is actuated by the following mechanism:

The crank pin 27, which is carried by the disk 22', see Figures 20 and 24 is driven by the shaft 21' and upon the tripping of the foot lever, this shaft is driven after the rollers and chains are stopped, this action being later described.

The crank pin hence drives the connecting rod 28, Figure 17, and the lever 30 and through the drag link 33 the ram 35, so the motion of the ram to the left and its return to its normal position at the right, Figure 17, is not affected by the continued stopping of the rotating mechanism driving the rolls and chains. When the ram has returned to its normal position, the operator of the machine swings the bell crank 38, Figures 1—2 and 11, in a counter-clockwise position thus lifting the wire guides above the plane of the completed lath-board. This allows the completed unit to pass out under the raised guides, as plainly shown in Figure 27. The ram and guide are swung upwardly together, and the reciprocating head of the ram drives a plurality of individual rams or shooters 83, which are mounted on guide plates 83', reciprocating in ways provided in the individual guide members as plainly shown in Figures 13 to 15 inclusive.

As shown in Figure 27, a transfer belt 107 operated by any suitable means is positioned just below the wiring guide, and roller 108 carried by depending feet 109, supported by the guide, carry the belt up and down in relation to the guide so the completed unit may be taken away from the machine below and substantially parallel to the guide.

*Clutch mechanism.*

It will be evident from the foregoing description that the stopping of the material at the proper point for the action of the forming shafts 88 is very important, as the failure to stop at the proper point would cause the improper positioning of the reinforcing wires longitudinally in the material.

I have therefore provided means for the automatic functioning of the necessary mechanisms to secure this, and in such a manner that when the machine is operating, the rotation of the rolls and the chains is automatically stopped at the proper point. The operator then trips the foot lever 99, which releases the dog 100, Figures 17, 18 and 22, thus allowing the lower clutch 101 to drive the shaft 21′ thereby rotating the disk 22 and causing the motion of the ram heretofore described.

When the cam 102 has turned through approximately 180°, it strikes the cam roller 103, Figure 17, carried by the bell crank 104 hinged at 105 to the frame of the machine, this motion releasing the dog 106 in the upper clutch thus allowing that clutch to drive the shaft 6, which drives all of the rotary mechanisms.

Inasmuch as the dogs 100 and 106 are always in position to engage with their respective catches in their clutches, it is evident that only one revolution will be made at a time and that at the end of that time the rotary motion will cease until the foot lever 99 has been actuated.

The mechanism is so timed that the rotary motion will be stopped with the operating slat 87′ in the proper position for the wiring operations.

The two clutches are similar and are constructed as follows: The gear 21 has cast, or formed integral, therewith a brake drum 110, and this gear has a bushing 111 which runs freely on the shaft 21′, see Figures 21 and 22.

Keyed to the shaft 21′ is a spider 112, and a second spider 113 has a bushing 114 which runs freely on the drum 115 of the spider 112.

The spider 112 has a plurality of segments 116 extending radially, and the spider 113 has a plurality of segments 117. The pin 118, which is mounted in one of the segments 116, carries one end of the brake band 119, and the opposite end of the brake band is fastened to the pin 120 carried by one of the segments 117.

Springs 121 serve to normally draw the brake band into operative relation with the brake drum 110.

One of the segments 116′ is cut away, as shown in Figure 22, so as to allow the dog 100 to catch the shoulder of the adjacent segments 117, and it is apparent that with the clutch rotating in a clock-wise motion, as shown in Figure 22, this will first release the clutch, and then as the segments 117 are driven into contact with the segments 116, the clutch will be stopped at an exact predetermined point in its revolution.

While I have described my invention and illustrated it in one particular design, I do not wish it to be understood that I limit myself to this construction as it is evident the application of the invention may be varied in many ways within the scope of the following claims.

I claim:

1. In a machine for making lathboard, the combination of a pair of co-acting crimping rolls, one of said rolls having a plurality of slat-like ribs thereon whose faces and sides are flat, the other of said rolls having a plurality of trough-like grooves therein co-acting with said ribs, and having the bottoms and side walls flat, the width of the bottom of said grooves and of the faces of said ribs being substantially the same and the angles formed by the bottoms of said grooves and the walls thereof being greater than the angles formed between the faces of said ribs and the sides thereof.

2. In a machine for making lathboard, a crimping roll, an ejector for said roll and means for actuating said ejector at a pre-determined point.

3. In a machine for making lathboard, a crimping roll having trough-like grooves therein, ejectors for said trough-like grooves, and a cam associated therewith for actuating said ejectors at a pre-determined point in the rotation of said roll.

4. In a machine for making lathboard, the combination with a pair of crimping rolls of ejectors in one of said rolls, means for actuating said ejectors, and a guide associated with the other of said rolls, so material forced from one roll by the ejectors therein will be controlled by said guide.

5. In a machine for making lathboard, the combination with a crimping roll, having ejectors therein, of a gathering chain associated with said roll and adapted to receive material there-from.

6. In a machine for making lathboard, the combination with a crimping roll, having a plurality of ejectors therein, of a gathering chain associated there-with, and means for actuating said ejectors at a pre-determined point whereby material carried on said roll shall be transferred to said chains.

7. In a machine for making lathboard, the combination with a crimping roll of a carrying chain associated there-with, a guide associated with said roll and said chain, a plurality of ejectors for said roll and means for actuating said ejectors at a predetermined point to transfer material from said roll to said chain and said guide.

8. In a machine for making lathboard, the combination with a pair of crimping rolls, of a guide associated with one of said rolls, means for forcing material from the other of said rolls to the control of said guide, gathering means associated with said guide and the other of said rolls, means in said second roll for transferring material there-from to said gathering means.

9. In a machine for making lathboard, the combination of two crimping rolls, a guide associated with said rolls, means in said first roll for forcing material there-from to the control of said guide and said second roll, gathering means associated with said second roll, and means in said second roll for forcing material there-from to said gathering means.

10. In a machine for making lathboard, the combination of a pair of crimping rolls with gathering means associated with the second of said rolls, means in said second roll for transferring material therefrom to said gathering means, and a guide associated with said gathering means.

11. In a machine for making lathboard, a gathering means comprising in combination a plurality of slats inter-connected to form chains, strips on said slats for receiving corrugated material, and pins on said strips for puncturing said material so said gathering means may keep firm control of said corrugated material.

12. In a machine for making lathboard, the combination with a crimping roll of a gathering chain having strips thereon to receive material from said roll, pins carried on said strips for piercing said material, and means associated with said material for transferring material to said strips and forcing the material onto said pins.

13. In a machine for making lathboard, the combination with a pair of crimping rolls of a pair of gathering chains having a plurality of slats there-across, a guide associated with the second of said rolls for guiding material crimped by said rolls and leading it to one of said chains, and a guide associated with the first of said chains for leading material thereon to a second of said chains.

14. In a machine for making lathboard, the combination with a pair of crimping rolls of a pair of gathering chains, means associated with the first of said rolls for forcing material crimped by said rolls from said first roll so it may be carried by said second roll to the first of said gathering chains, means associated with said second roll for forcing material carried thereby from said roll onto the first of said chains, a guide for said second roll and a guide for said first chain.

15. In a machine for making lathboard, the combination of gathering means for receiving thereon corrugated sheet material with pins carried by said gathering means for puncturing said material to insure a positive grip of said material by said gathering means.

16. A gathering means for a lathboard machine comprising in combination a plurality of slats having cut-away portions, links mounted in said cut-away portions joining said slats, and forming with said slats a continuous chain.

17. Gathering means for a lathboard machine comprising in combination an endless chain formed of a plurality of parallel slats and links connecting said slats, a rectifier roll, having flat faces thereon for carrying said slats as they pass over said rectifying roll, and a sprocket associated with said links for driving said chain.

18. Gathering means for a lathboard machine comprising a pair of chains, each formed of a plurality of slats with connecting links and adapted to receive and grip there-between corrugated sheet material, and pins carried by the slats of one of said chains for puncturing said material to insure a positive grip thereof.

19. In a lathboard machine, the combination with a pair of gathering chains adapted to gather corrugated material into a dove-tailed shape of means for forcing a reinforcing wire into material carried by said gathering means, and means for forming the end of said wire over against said material after it has been forced there-through.

20. In a lathboard machine, the combination with means for forming material into a dove-tailed shape of reciprocating means for forcing reinforcing wires through the webs of said dove-tailed shaped material, and means for forming the ends of the wires over against said material to hold the material in its dove-tailed shape.

21. In a lathboard machine, the combination of a wiring guide comprised of a plurality of hinged members slotted to receive wires therein, with a reciprocating ram having a shooter thereon to force wire carried in said slotted members longitudinally in said guides.

22. Wiring means for forcing reinforcing wires into the webs of corrugated material comprising a reciprocating ram having a plurality of individual shooters thereon, and wire guides to receive wire to be acted upon by said shooters.

23. In a machine for making lathboard, the combination of means for forming material into corrugated shape, wire guides associated therewith and adapted to receive wires in position to be forced into the webs of said material, and a reciprocating ram for forcing said wires into said material.

24. In a machine for making lathboard, the combination with means for forming corrugated material of wiring guides comprised of individual hinged members and positioned to receive wire to be forced into the webs of said material, and a reciprocating ram for forcing said wires, said individual members disappearing under said ram as it forces said wires.

25. In a machine for making lathboard, the combination with means for gathering material into a corrugated formation of means for forcing wire into said formed material and means for swinging said last named means out of operating relation with said gathering means.

26. In a machine for making lathboard, the combination with means for forming material into a corrugated shape, of means for forcing reinforcing wires into said material and means associated with said last named means for leading the completed material from the machine.

27. In a machine for making lathboard, the combination of means for corrugating material, means associated therewith for gathering said material into a dove-tailed shaped formation, and means for wiring units of said dove-tailed shaped material leaving unwired portions of said material between said units.

28. In a machine for making lathboard, the combination of means for corrugating material, means associated therewith for gathering said material into a dove-tailed shaped formation, means for wiring units of said dove-tailed shaped material leaving unwired portions of said material between said units, and means associated with said last named means for conveying the sheet of units with the flexible portions there-between from said machine.

29. Wiring means for a lathboard machine comprising the combination of a frame with a plurality of wiring guides carried by said frame and having a slidable ram mounted in said frame.

30. In a lathboard machine, the combination with means for forming corrugated material, of wiring means comprising a frame, wire guides and a ram, and means for swinging said wiring means out of operative relation with said forming means.

31. In gathering means for a lathboard machine, the combination with other slats, of a slat having a plurality of rotatable shafts mounted therein, each of said shafts having a forming head thereon, means holding said forming heads in normal position, levers fixed to said shafts, a link hinged to said levers and having an extended end, and means associated with said gathering means for reciprocating said link.

32. In a lathboard machine, the combination with means for forming material into a corrugated formation, of means for stopping said material at a pre-determined point, and separately actuated means for forcing reinforcing wires into said material while stopped.

33. In a lathboard machine, the combination with means for forming material into a corrugated formation, of means for stopping said material at a pre-determined point, separately actuated means for forcing reinforcing wires into said material, and means for swinging said last named means out of operative relation with said first named means.

34. In a machine for making lathboard, the combination with a pair of crimping rolls of a pair of gathering chains, means for driving said rolls and said chains, clutch means for stopping said drive at pre-determined points, means for forcing wire into material in said gathering means, and separately controlled means for causing the operation of said wirings means.

35. In a machine for making lathboard, the combination with a pair of crimping rolls of a pair of gathering chains, power means for driving said machine, a clutch controlling the application of power to said rolls and chains, means for actuating said clutch to stop said gathering means at pre-determined points, wiring mechanisms adapted to be driven by said power means, and a separate clutch for controlling the application of said power means to said wiring means.

36. In a machine for making lathboard, the combination with a pair of crimping rolls of a pair of gathering chains, power means for driving said machine, a clutch controlling the application of power to said rolls and chains, means for actuating said clutch to stop said gathering means at pre-determined points, wiring mechanisms adapted to be driven by said power means, a separate clutch for controlling the application of said power means to said wiring means, and automatic means for applying the power to said rolls and chains at a pre-determined time in the cycle of the actuation of said wiring means.

37. In a machine for making lathboard, the combination with a pair of crimping rolls of a pair of gathering chains, a clutch controlling the application of power to said rolls and chains, wiring means, a clutch controlling the application of power to said wiring means, automatic means for cutting off power at a pre-determined point, operator actuated means for applying power to said wiring means, and automatic means controlled by the actuation of said wiring means for again applying power to said rolls and chains.

38. In a lathboard machine, the combination of a pair of crimping rolls each having ejectors therein, a pair of gathering chains, the ejectors of one of said rolls forcing material therefrom to the second of said rolls, the ejectors of the second roll forcing material there-from to the first of said chains, a plurality of gathering slats carried by each of said chains including on one of said chains a wire forming slat, wiring means including wire guides, and a ram for forcing reinforcing wires into material carried by said chains, said forming slat being adapted to form over the ends of said reinforcing wires after they have been forced into said material.

39. The method of forming lathboard comprising the crimping of suitable material, gathering said crimped material into a dove-tailed formation, forcing reinforcing wires into the webs of said dove-tailed shaped material, forming the ends of said wires over to lock said wires into said material, and leading said completed unit from machine.

40. The method of making lathboard comprising the crimping of suitable material, gathering said crimped material into a dove-tailed shaped formation, forcing reinforcing wires through the webs of said material, forming unit lengths of reinforcing material with un-wired flexible portions therebetween and forming the ends of the reinforcing wires over to lock the dove-tailed shaped formations into permanent relation with each other.

CHARLES A. STICKNEY.